US012757090B2

(12) United States Patent
Timner et al.

(10) Patent No.: US 12,757,090 B2
(45) Date of Patent: Oct. 6, 2026

(54) CALCULATION OF COMBINED CELL RESELECT PRIORITIES WITH SLICE BASE CELL RE-SELECTION

(71) Applicant: Telefonaktiebolaget LM Ericsson (publ), Stockholm (SE)

(72) Inventors: Ylva Timner, Lulea (SE); Hakan Palm, Vaxjo (SE); Angelo Centonza, Granada (ES); Tomas Frankkila, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 335 days.

(21) Appl. No.: 18/702,616

(22) PCT Filed: Oct. 18, 2022

(86) PCT No.: PCT/IB2022/060010

§ 371 (c)(1),
(2) Date: Apr. 18, 2024

(87) PCT Pub. No.: WO2023/067504

PCT Pub. Date: Apr. 27, 2023

(65) Prior Publication Data

US 2025/0294421 A1 Sep. 18, 2025

Related U.S. Application Data

(60) Provisional application No. 63/256,869, filed on Oct. 18, 2021.

(51) Int. Cl.
*H04W 36/14* (2009.01)
*H04W 36/00* (2009.01)
(Continued)

(52) U.S. Cl.
CPC ... *H04W 36/142* (2023.05); *H04W 36/00835* (2018.08); *H04W 72/02* (2013.01); *H04W 72/0453* (2013.01)

(58) Field of Classification Search
CPC .............. H04B 1/7075; H04B 1/70751; H04B 1/70752; H04B 1/70753; H04B 1/70754;
(Continued)

(56) References Cited

U.S. PATENT DOCUMENTS

2023/0030150 A1* 2/2023 Shih ...................... H04W 76/30
2023/0055788 A1* 2/2023 Jung ................ H04W 36/0061
(Continued)

OTHER PUBLICATIONS

Kumar et al., "MAS5G: Move Around Smartly in 5G," 2019 7th International Conference on Future Internet of Things and Cloud (FiCloud), Istanbul, Turkey, 2019, pp. 214-221, doi: 10.1109/FiCloud.2019.00037 (Year: 2019).*
(Continued)

*Primary Examiner* — Thomas R Cairns

(57) ABSTRACT

Methods and systems are described for deriving slice-based reselection priorities. Embodiments can select a frequency that supports one or more network slices. Methods can include obtaining reselection priorities for each frequency on which a user equipment may camp, obtaining a slice priority for one or more prioritized slices and deriving slice-based reselection priorities for all frequencies with reselection priorities. A cell search can then be performed according to the slice-based reselection priorities.

20 Claims, 12 Drawing Sheets

(51) Int. Cl.
*H04W 72/02* (2009.01)
*H04W 72/0453* (2023.01)

(58) Field of Classification Search
CPC ............ H04B 1/70755; H04B 1/70756; H04B 1/70757; H04B 1/70758; H04B 1/7077; H04B 1/70775; H04B 1/708; H04B 1/76; H04B 7/088; H04L 12/5691; H04L 12/5692; H04W 36/0061; H04W 36/00835; H04W 36/008355; H04W 36/008357; H04W 36/14; H04W 36/142; H04W 36/24; H04W 40/24; H04W 40/242; H04W 40/244; H04W 40/246; H04W 40/248; H04W 40/26; H04W 40/28; H04W 40/30; H04W 40/32; H04W 48/16; H04W 48/18; H04W 48/20; H04W 72/02; H04W 72/0453; H04W 72/23; H04W 72/231; H04W 72/232; H04W 72/40; H04W 74/0866; H04W 74/0875; H04W 74/0883; H04W 74/0891; H04W 76/00
See application file for complete search history.

(56) References Cited

U.S. PATENT DOCUMENTS

| | | | | |
|---|---|---|---|---|
| 2023/0300738 | A1* | 9/2023 | Liu | H04W 48/20<br>370/329 |
| 2024/0073761 | A1* | 2/2024 | Fu | H04W 36/08 |
| 2024/0349143 | A1* | 10/2024 | Lin | H04W 36/0061 |

OTHER PUBLICATIONS

Xenakis et al., "Mobility Management for Femtocells in LTE-Advanced: Key Aspects and Survey of Handover Decision Algorithms," in IEEE Communications Surveys & Tutorials, vol. 16, No. 1, pp. 64-91, First Quarter 2014, doi: 10.1109/SURV.2013.060313.00152 (Year: 2014).*

3GPP TS 38.304 V16.6.0 (Sep. 2021), 3rd Generation Partnership Project; Technical Specification Group Radio Access Network; NR; User Equipment (UE) procedures in Idle mode and RRC Inactive state (Release 16).

3GPP, "3rd Generation Partnership Project; Technical Specification Group Services and System Aspects; System architecture for the 5G System (5GS); Stage 2 (Release 17)", 3GPP TS 23.501 V17.2.0, Sep. 2021.

3GPP; 3GPP TS 23.502 V17.2.1, "3rd Generation Partnership Project; Technical Specification Group Services and System Aspects; Procedures for the 5G System (5GS)"; Stage 2, (Release 17) Sep. 2021.

CMCC, "Discussion on the solutions for slice based cell reselection", 3GPP TSG-RAN WG2 Meeting #115-e, Electronic Meeting, Aug. 16-27, 2021, pp. 1-5, R2-2108497, 3GPP.

Ericsson, "Slice-based cell re-selection algorithm", 3GPP TSG-RAN WG2 #116e, Electronic meeting, Nov. 1-12, 2021, pp. 1-9, R2-21100699, 3GPP.

Lenovo et al., "Comparison of Solution Options", 3GPP TSG-RAN WG2 Meeting #115 e, E-Meeting, Aug. 9-27, 2021, pp. 1-78, R2-2108025, 3GPP.

Lenovo et al., "Summary of [AT114-e][250][Slicing] Usage of slice priorities for cell reselection (Lenovo)", 3GPP TSG-RAN WG2 Meeting #114 e, E-Meeting, May 19-27, 2021, pp. 1-31, R2-2106501, 3GPP.

ZTE Corporation et al., "Discussion on slice-aware cell reselection", 3GPP TSG-RAN WG2 Meeting#115-e, Electronic, Aug. 9-27, 2021, pp. 1-10, R2-2107730, 3GPP.

* cited by examiner

| Frequency | A | B | C | D | E | Comment |
|---|---|---|---|---|---|---|
| Slice prio=6 | X | - | X | - | - | Step 110/310 |
| Slice prio=5 | - | - | X | - | - | Step 110/310 |
| Slice prio=4 | X | - | - | - | - | Step 110/310 |
| Slice prio=3 | X | X | - | X | - | Step 110/310 |
| Slice prio=2 | - | - | - | - | - | Step 110/310 |
| Slice prio=1 | X | X | - | X | - | Step 110/310 |
| Support prio | 101101 | 000101 | 110000 | 000101 | 000000 | Step 110/310 |
| Support prio | 45 | 5 | 48 | 5 | 0 | Step 120/320 |
| Legacy | 10 | 3 | 1 | 4 | 2 | Step 130/330 |
| Slice based resel. priority | 452 | 53 | 481 | 54 | 2 | Step 140/340 |

FIG. 4

| Frequency | A | B | C | D | E | Comment |
|---|---|---|---|---|---|---|
| Slice prio=6 | 7 | - | 4 | - | - | Step 110/310 |
| Slice prio=5 | - | - | 10 | - | - | Step 110/310 |
| Slice prio=4 | 5 | - | - | - | - | Step 110/310 |
| Slice prio=3 | X | X | - | X | - | Step 110/310 |
| Slice prio=2 | - | - | - | - | - | Step 110/310 |
| Slice prio=1 | 3 | 7 | - | 5 | - | Step 110/310 |
| Support prio | 6 | 3 | 6 | 3 | 0 | Step 120/320 |
| Legacy resel.p | 10 | 3 | 1 | 4 | 2 | Step 130/330 |
| Resel.p | 7 | 3 | 4 | 4 | 2 | Step 130/330 |
| Slice based resel. priority | 67 | 33 | 64 | 34 | 2 | Step 140/340 |

FIG. 5

| Frequency | | A | B | C | D | E | Comment |
|---|---|---|---|---|---|---|---|
| **Slice prio** | Slices | | | | | | |
| **3** | a | 7 | 4 | - | 6 | - | Step 110 |
| **2** | b, c, e | 5, -, X | 2, -, - | 3, 4, X | -, 6,- | -, -, - | Step 110 |
| **1** | d | X | X | - | X | - | Step 110 |
| **p1** | | 1 | 1 | 0 | 1 | 0 | Step 120 |
| **p2** | | 1 | 1 | 1 | 1 | 0 | Step 120 |
| **p3** | | 10 (2) | 01 (1) | 11 (3) | 01 (1) | 00 (0) | Step 120 |
| **p4** | | 1 | 1 | 0 | 1 | 0 | Step 120 |
| **Support prio** | | 11101 | 11011 | 01110 | 11011 | 00000 | Step 130 |
| **Support prio** | | 29 | 27 | 14 | 27 | 0 | Step 130 |
| **Legacy resel.p** | | 10 | 3 | 7 | 4 | 2 | Step 140 |
| **Resel.p** | | 7 | 4 | 4 | 6 | 2 | Step 140 |
| **Slice based resel. priority** | | 297 | 274 | 144 | 276 | 2 | Step 150 |

FIG. 6

CALCULATION OF COMBINED CELL RESELECT PRIORITIES WITH SLICE BASE CELL RE-SELECTION

CROSS REFERENCE TO RELATED INFORMATION

This application is a national-phase entry under 35 USC § 371 of International Application No. PCT/IB2022/060010, filed Oct. 18, 2022, titled "Calculation of Combined Cell Reselect Priorities with Slice Base Cell Re-Selection"; which claims the benefit of U.S. Provisional Application No. 63/256,869, filed Oct. 18, 2021, titled "Calculation of Combined Cell Reselect Priorities with Slice Base Cell Re-Selection," the contents of which are hereby incorporated herein in its entirety.

TECHNICAL FIELD

The present disclosure generally relates to the technical field of wireless communications and more particularly to cell reselection techniques.

BACKGROUND

A "network slice" can be used to refer to a logical network serving a defined business purpose or customer, comprising all required network resources end-to-end. This means that a network slice can comprise all Network (NW) Functions, and both Control Plane and User Plane, required or useful to provide given service(s). Some functions can be shared (e.g., the same Network Function can be in multiple Network Slices), but a network slice preferably comprises all network functions and is not just a subset.

The current working assumption is that there will be one shared or dedicated Radio Access Network (RAN) infrastructure that will connect to several CN (Core Network) instances (with one or more shared NW Functions (NF), interfacing the RAN, plus additional CN functions which may be dedicated for a slice. Such CN instances are shown in the example FIG. 1 as part of the central Data Centre (DC) 9. The CN functions are being virtualized, as seen in the architecture shown in FIG. 1. Each network slice 10 can comprise aspects of access 5, aggregation 6, edge DC 7, backbone 8, and central DC 9.

In 3GPP systems, the UE (user equipment) cell-reselection in IDLE and INACTIVE mode is described in TS 38.304. The UE receives cellReselectionPriorities for the frequencies in the network and will use these to select what frequency to camp on.

In 3GPP rel-17, new solutions were developed to enable slice-aware UE cell reselection in IDLE mode and INACTIVE mode. The objective of the work was to enable the UE to reselect to a cell on a frequency that support network slices that are in use or intended to be used by the UE. In the described approaches, the UE is informed of the slices supported by the cells on frequencies by broadcast signalling (system information). This information can also be signalled in dedicated RRC signalling to each UE. The UE can use rules on slice priorities together with the information on slice support in cells and reselect to an appropriate cell. 3GPP has different methods that have been proposed for slice-based cell reselection, including at 3GPP TSG-RAN WG2 Meeting #115 e.

The method with most standardization support will first do cell search based on the slice specific reselection priorities for the highest prioritized slice, and if no suitable cell is found, cell search will continue with the slice specific reselection priorities of the second prioritized slice etc., and at last legacy cell re-selection will be performed based on the cellReselectionPriorities. "Suitable cell" is defined in TS 38.304, as follows: "This is a cell on which a UE may camp. For NR cell, the criteria are defined in clause 4.5, for E-UTRA cell in TS 36.304."

There currently exist certain challenges. For example, Rel-15/16 cell reselection procedures do not take slice priority into account, which means that a UE might do cell reselection to a frequency that is not configured for the slice. With the slice-based cell-reselection proposed in standardization for Rel-17, major changes to the current cell re-selection procedure are needed, and the re-selection including radio measurements is done through multiple iterations, causing delays or complex implementation that ensure that measurements are saved between the iterations.

One issue with the slice-based cell-reselection solutions proposed so far is that, for the calculation of which frequency has the highest priority for Idle mode camping, the UE will take into account only slice related information of the highest prioritized slice in a first iteration. Slice related information may provide details such as priorities associated to one or more slices that are allowed to access or configured for a UE, and/or frequency priorities for frequencies that may support such slices, or that may be preferred to serve such slices.

In such a process, there is likelihood that none of the frequencies with cell re-selection priorities calculated by the UE is in coverage. That is because such cell re-selection priority does not provide, as a result, priorities for all frequencies in the network, but only for a subset of them. In the case where none of the frequencies the UE selected for camping is in coverage, the UE would need to do multiple iterations, taking slice information of lower prioritized slices into account, and if that does not help, fall back to legacy the reselection priorities that would provide cell reselection priorities for all frequencies in the network.

SUMMARY

One embodiment under the present disclosure is a method performed by a UE for deriving slice-based cell reselection priorities for selecting a frequency that supports one or more network slices. The method includes obtaining one or more reselection priorities for each frequency on which the UE may camp; and obtaining a slice priority for one or more prioritized slices. The method also includes deriving slice-based reselection priorities for the frequencies having the reselection priorities; and performing cell search according to the derived slice-based reselection priorities.

Another possible embodiment under the present disclosure is a method performed by a network for providing data to a UE for deriving slice-based reselection priorities for selecting a frequency that supports one or more network slices. The method includes transmitting, to the UE, a slice priority for one or more prioritized slices; transmitting, to the UE, one or more reselection priorities for each frequency on which the UE may camp; and transmitting, to the UE, one or more slice-specific reselection priorities configured to be combined with the slice priority and the reselection priorities to derive slice-based reselection priorities for the frequencies on which the UE may camp. It can further include receiving a cell selection from the UE indicative of a target cell on which the UE chooses to camp based on the derived slice-based reselection priorities.

A further embodiment comprises a UE for calculating a frequency selection policy for selecting a frequency in one or more network slices. The UE comprises processing circuitry configured to perform any of the steps of any of methods for UEs described herein; and power supply circuitry configured to supply power to the processing circuitry.

A further embodiment comprises a network node for providing data to a user equipment for calculating slice-based reselection priorities for selecting a frequency that supports one or more network slices. The network node comprises processing circuitry configured to perform any of the steps of any of the network methods described herein; and power supply circuitry configured to supply power to the processing circuitry.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

For a more complete understanding of the present disclosure, reference is now made to the following descriptions taken in conjunction with the accompanying drawings, in which:

FIG. 4 shows a table of sample priority calculations under the present disclosure;

FIG. 5 shows a table of sample priority calculations under the present disclosure;

FIG. 6 shows a table of sample priority calculations under the present disclosure;

DETAILED DESCRIPTION

Figure 1:
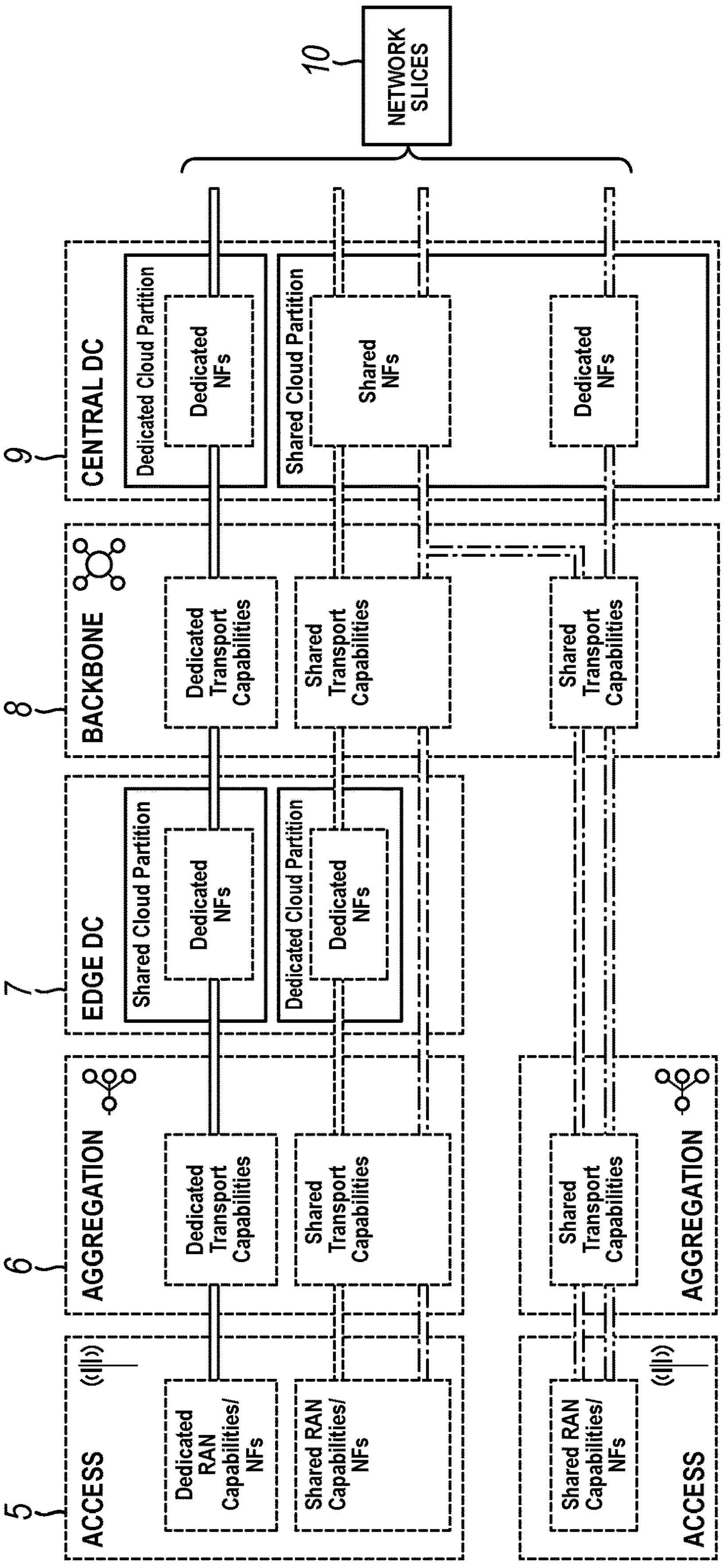
FIG. 1 illustrates the concept of network slices.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed embodiments. In addition, the terminology used herein is for the purpose of describing the embodiments and is not necessarily intended to limit the scope of the claimed embodiments.

Certain aspects of the disclosure and the embodiments described herein may provide solutions to the challenges described above and other challenges in the art. Certain embodiments may provide one or more of the following technical advantages described below. For example, certain embodiments can provide a way for the UE to derive a single frequency selection policy from a number of parameters providing priority scores at different levels such as at slice level, at frequency per slice level, or at frequency level (independently of slices).

In one embodiment under the current disclosure, the UE is able to calculate frequency priorities for all frequencies supported in the network, by means of combining parameters useful for cell reselection that are associated to network slices and that are taken from legacy cell-reselection mechanisms.

In this way, the following parameters may be combined:
- Slice specific parameters, which may provide information of what slices the UE may need to use, and how to prioritize these slices;
- Slice and frequency specific parameters, which provide information about what frequencies support specific slices, and may provide higher weight to certain frequencies, e.g., on the basis of the slices such frequencies may support; and
- Frequency specific parameters, namely parameters that provide frequency priorities in a slice independent way.

The result of techniques described herein can be that the UE will have frequency priorities for all frequencies in the network, where such priorities take slice support and slice priority into account, for frequencies where this is applicable, while they take only frequency priorities into account for frequencies where no slice priority or specific slice support policies are applicable.

In one embodiment, the UE receives a number of parameters from the network that should help the UE in determining the right cell reselection priority policy to use in order to select a frequency on which to camp.

The AS layer in the UE may receive one or more of the following information:
- List of network slices that are allowed for the UE;
- List of slices that are configured for the UE;
- Prioritization for each allowed or configured slice, namely a score of the priority of each slice in terms of which frequency to select while in Idle; and
- Slice specific lists of preferred frequencies. Namely for each slice, a list of frequencies in priority order (or where each entry is marked with a priority) assigned to each slice.

From one or more of the information types listed above the UE may be able to derive one or more "Slice Based Reselection Priority." The Slice Based Reselection Priority is a single reselection priority derived by the UE in order to select a frequency on which to camp in Idle mode, taking into account all the parameters that might influence frequency selection.

These slice-based reselection priorities are used by the cell re-selection functionality instead of the broadcasted legacy reselection priorities. In that way the legacy cell-reselection procedure is not modified or repeated several times with different frequency priorities.

The reselection priorities can be derived using many methods, depending on wanted behavior and available input.

For example, if the available input is a priority level per slice, list of supported frequencies per slice, and legacy reselection priorities, then one example of how the Slice Based Reselection Priority can be derived is:

$$SliceBasedReselectionPriority = MaxSlicePriority * MaxReselectPriority + CellReselectionPriority$$

Where MaxSlicePriority is the priority of the highest prioritized slice that the frequency supports. If the frequency does not support any of the prioritized slices, the value 0 is used. CellReselectionPriority is a reselection priority that is common for all slices on this frequency, and MaxReselect-Priority is a constant that is the maximum value of the reselection priority +1, or higher.

This method helps ensure that a frequency supporting the highest prioritized slice will be selected if available. If not, a frequency supporting the second prioritized slice is selected, etc. If there are several frequencies supporting the same prioritized slice, the frequencies can preferably be prioritized based on the CellReselectionPriority. If there are frequencies that do not support any of the prioritized slices, the UE can preferably select them with lowest priority, in the order of the CellReselectionPriority.

After a target cell at a target frequency have been selected, using the legacy cell-reselection algorithm, the slice support on the target cell may be evaluated. If there is inhomogeneous slice support on the target frequency, the target cell might not support all slices that are supported on the cells within the same frequency. In particular, the target cell may not support the highest priority slice for the UE or the two first high priority slices etc. In that case, an updated slice-based reselection priority can be calculated for that frequency based on the actual slice support of current cell, and the cell re-selection procedure is resumed, using this value.

Accordingly, embodiments under the current disclosure can comprise a method for Inter-frequency cell reselection where 'slice-based reselection priorities' are used to select a frequency to camp on, instead of the currently used cellReselectionPriorities. The 'slice-based reselection priorities' can be calculated based on a set of prioritized slices, information of slice support per frequency, and cell reselection priorities. The cell reselection priorities can be based on the cellReselectionPriorities, derived from slice specific reselection priorities, or a combination of both parameters.

Some of the embodiments contemplated herein can now be described more fully with reference to the accompanying drawings. Embodiments are provided by way of example to convey the scope of the subject matter to those skilled in the art.

Figure 2:
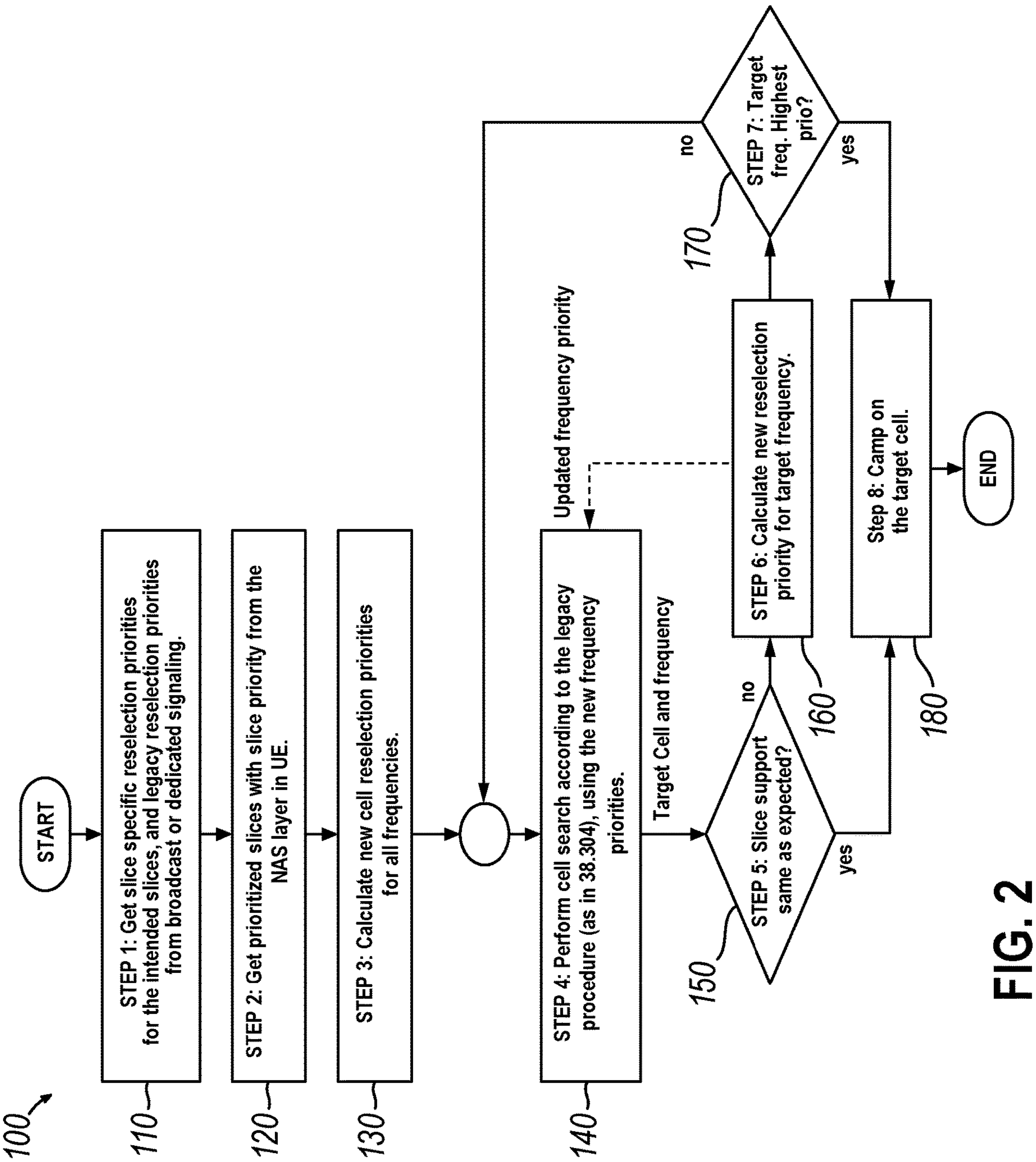
FIG. 2 shows a flow-chart of a method embodiment under the present disclosure.

In FIG. 2, a flow chart of one embodiment of a described solution is shown, which can result in minimal impact on the legacy procedures. Method 100 comprises a method for performing slice-based cell reselection. The steps in method 100 can run within a UE. In this embodiment, step 110 is to get slice specific reselection priorities for the intended slices, and legacy reselection priorities from broadcast or dedicated signaling. Step 120 is to get prioritized slices with slice priority, such as from the NAS layer in the UE. Step 130 is to calculate new cell reselection priorities for all frequencies. Step 140 is to perform cell search according to the legacy procedure (such as set forth in 38.304), using the new frequency priorities, including updated frequency priorities from step 160. Step 140 can yield a target cell and frequency. Step 150 is to evaluate slice support of the target cell and determine if the slice support is the same as expected. If yes, then the UE can camp on the target cell, at step 180. If no, then the method can proceed to step 160, which is to calculate new slice-based reselection priority for the target frequency. The updated frequency priority can be used in step 140. At step 170 it is determined if the target frequency still has the highest priority. If yes, then the method can proceed to camp on the target cell at step 180. If the target frequency is not the highest priority, the method can return to step 140. In some embodiments, the method can stop at step 140, making subsequent steps optional. Alternatively, the method can make steps 150, 160, and 170 optional. In these embodiments, after step 140 (performing cell search . . . ), the UE can select a frequency and camp there under step 180.

Figure 3:
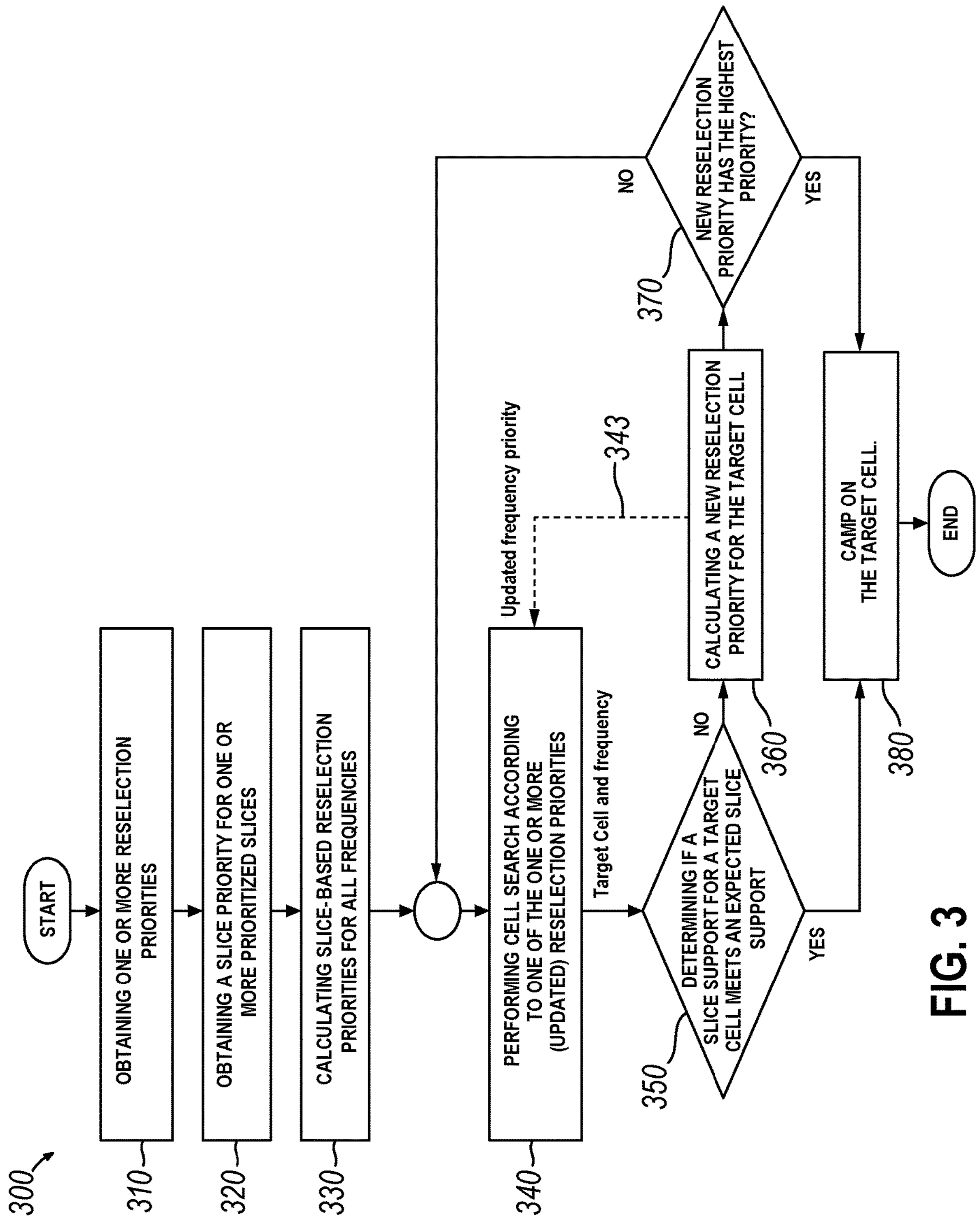
FIG. 3 shows a flow-chart of another method embodiment under the present disclosure.

Another embodiment of a method under the present disclosure is shown in FIG. 3. The steps of FIG. 3 are similar to the steps of FIG. 2. Step 310 is obtaining one or more reselection priorities. Step 320 is obtaining a slice priority for one or more prioritized slices. Step 330 is calculating slice-based reselection priorities for all frequencies. Step 340 is performing cell search according to one of the one or more (sometimes updated) reselection priorities. Step 350 is determining if a slice support for a target cell meets an expected slice support. At 380 is, if the slice support meets the expected slice support, then camping on the target cell. At 360 is, if the slice support does not meet the expected slice support, then calculating a new reselection priority for the target cell. At 343, the new updated frequency priority can be applied to the reselection priorities used in step 340. From 370, if the new reselection priority has the highest priority, then proceeding to step 380 and camping on the target cell. At 370, if the new reselection priority does not have the highest priority, then the process continues to 340 continue performing cell search according to the one of the one or more reselection priorities. In some embodiments, step 350-380 can be optional. In some embodiments after step 340 (performing cell search . . . ) the UE can choose a frequency to camp on and camp there under step 380.

Further description of possible embodiments and variations of the steps of FIG. 3 follows below. Reference is made to the steps of method 300 of FIG. 3, but similar variations and embodiments can be implemented with the related method steps of method 100 of FIG. 2.

Step 310—Obtaining One or More Reselection Priorities

Step 310 can comprise getting one or more reselection priorities, such has slice specific and legacy reselection priorities. The slice information may be available for all slices or a subset of slices. For each slice, the slice information may include, at least:

- a list of frequencies where the slice is supported;
- slice specific priority of each frequency supporting the slice;
- list of neighbouring cells supporting the slice;
- list of TAI's (tracking area identifiers) supporting the slice.

In some embodiments, step 310 may be carried out for each frequency where the UE may camp.

Step 320—Obtaining a Slice Priority for one or More Prioritized Slices

Step 320 can comprise obtaining a slice priority for one or more prioritized slices. The AS layer can receive a list of slices prioritized for cell re-selection, and a priority value for each of these slices. In some embodiments this may be sent from the NAS (non-access stratum) layer in the UE to the AS (access stratum) layer.

Step 330—Calculate Slice-Based Reselection Priorities for all Frequencies

Step 330 can comprise calculating slice-based reselection priorities for all frequencies. Slice-based reselection priorities can be derived using many methods, depending on wanted behavior and available input. Two or more sub-priorities (p1, p2, . . . , pN) can be derived for each frequency, and combined to form the Slice Based Reselection Priorities. At least one sub-priority can be based on the support of prioritized slices on the frequency (see Alternatives for Sub-priorities based on support of prioritized slices, below), and at least one can be based on reselection priorities (see Alternatives for Sub-priorities based on reselection priorities, below). The sub-priorities can be combined to form the slice-based reselection priority.

Methods for Combining Sub-Priorities

If the wanted behavior is that the sub-priorities are considered one after the other, they can be combined in priority order, such as through the following method.

The sub-priorities p1, p2, p3, p4 . . . pn, have values where the highest number is of highest priority, and they are within the ranges of 1 to r1, 1 to r2, 1 to r3 and 1 to r4 . . . 1 to rn. The slice-based reselection priority for a frequency can then be given by: ((p1*r2+p2)*r3+r3)*r4+p4 . . . ).

The same wanted behavior can also be achieved if the range of the priorities are given by the number of digits of the parameters p1, p2 . . . , and the digits are concatenated to form a larger number. For example, if the range of p1, p2, p3 is 0-9, they can each be represented by a digital digit, and if p1=4, p2=6 and p3=9, the slice-based reselection priority=469. The same method can be used in binary or hex form.

Depending on the wanted behavior, other methods can be used to combine the sub-priorities. For example, the priorities can be summarized, or first normalized to get the same value range, and then summarized.

Alternatives for Sub-priorities Based on Support of Prioritized Slices

Slice support per frequency may be provided for all prioritized slices, or a subset of the slices. If there is no slice support information available for a slice, there may be two alternatives as how to interpret this:

- the slice is supported on all frequencies in the network; or.
- the slice support shall not be taken in account for cell re-selection, or the slice is not supported on any available frequency.

The slice support on the frequency can be considered in multiple ways, using one or more sub-priorities. In the examples described below, the sub-priorities are combined in priority order (p1, p2 . . . pn).

a) p1=Priority of the slice(s) highest prioritized and supported on the frequency. If no prioritized slice is supported, p1=0.

b) p1=Priority of the slice(s) highest prioritized and supported on the frequency, if no prioritized slice is supported, p1=0; p2=Number of supported slices with the same priority as p1. (p2=0 if p1=0)

With this method, if there are several slices with same slice priority, frequencies supporting several of them get higher priority than a frequency only supporting one.

c) p1, p2 . . . =One-bit binary representation of slice support where p1 gives support of slice with highest priority, p2 support of slice with second highest priority etc. p1, p2, p3 . . . can be combined to form a binary number taking the support of all prioritized slices into account.

d) p1, p3 . . . =One-bit binary representation of slice support where p1 gives support of slice with highest priority, p3 support of slice with second highest priority etc. p2=Number of slices with highest priority, p4=Number of slices with second highest priority, etc.

When the sub-priorities are combined in order of the numbering, support of all prioritized slices are taken into account, even if there are several slices with same priority. If the priorities p2, p4 . . . are given in binary form, all sub-priorities can be concatenated to form a binary number.

Note that the case when there are no slice priorities provided, a special case of solution c or d can be used, where all prioritized slices have the priority 1.

Alternatives for Sub-Priorities Based on Reselection Priorities

In another alternative embodiment, sub-priorities can be based on re-selection priorities (P1, P2. . . . Pn). Described below are several embodiments with sub-priorities derived from legacy cell re-selection priorities and/or slice specific reselection priorities. The sub-priority is named Pr. Some alternatives are:

a) Pr=Legacy cell-reselection priority. When only legacy values are provided, this option is preferred.

b) Pr=Slice specific reselection priority of the slice highest prioritized and supported. When slice specific values are provided for all slices, this option is preferred.

c) Method b, wherein if no slice specific reselection priority is available for a supported slice, the value 0 is used instead. It is assumed that frequency-slice combinations where no slice specific reselection priority are provided have lower priority than other frequency-slice combinations.

d) Method b, wherein if no slice specific reselection priority is available for a supported slice, the legacy value is used instead. With this method, slice specific frequency priorities can be omitted whenever the value of the legacy cell-reselection priority is sufficient.

First Example of Step 330

In this example, alternative c) is used for slice support and alternative a) for re-selection priority. The sub-priorities are combined in priority order, giving slice support higher priority.

1. A slice_support_priority is calculated for each frequency, as a bit map of the supported slices. For example, for a frequency A, support the slices with priority 6,4,3 and 1, as shown in the Table 1 below, the bitmap would be 101101.
2. The slice_support_priority can be converted to digital (e.g., for frequency A, 101101=32+8+5=45).
3. The re-selection priority is given by the legacy cell-reselection priority with range=10.
4. The slice_based_reselection_priority can be calculated by multiplying the slice_support_priority with the range of the legacy reselection priority, and adding the legacy cell reselection priority value for the frequency. For frequency A, 45*10+2=452.

Results can be seen in FIG. 4. The resulting priority order for cell reselection is frequency C, A, D, B, E.

Second Example of Step 330

In this example, alternative a) is used for slice support and alternative d) for re-selection priority. The sub-priorities are combined in priority order, giving slice support higher priority. The slice specific reselection priority is summarized in FIG. 5.

1. A slice that is indicated as supported on a frequency, but not provided with a slice specific reselection priority is marked with an X. The slice with priority 3 is not provided with slice specific reselection priority.
2. The slice_support_priority is given by the highest prioritized slice that is supported by the frequency.
3. The reselection priority is set to the slice specific reselect priority of the slice that is highest prioritized and supported. If there is no slice specific reselect priority for that slice, legacy reselect priority is used, as shown for frequency B and D.
4. The slice_based_reselection_priority is calculated by multiplying the slice_support_priority with the range of the legacy reselection priority, and adding the legacy cell reselection priority value for the frequency. For example, for frequency A, 6*10+4=64.

Results are shown in FIG. 5. The resulting priority order for cell reselection is frequency A, C, D, B, E

Third Example of Step 330

In this example, alternative d) is used for slice support and alternative c) for re-selection priority. The sub-priorities are combined in priority order, giving slice support higher priority. The slice specific reselection priorities are summarized in FIG. 6.

1. There are several slices with the same priority, so for each frequency there may be several slice specific priorities for these frequencies. A slice that is indicated as supported on a frequency, but not provided with a slice specific frequency priority is marked with an X, and a frequency not supporting a slice is marked with -. The slice with priority 3 is not provided with slice specific frequency priority.
2. Partial slice support parameters p1-p4 are calculated, where p1, p2 and p4 are slice support for the prioritized slices in priority order. They are given the values 0 or 1 for each frequency, depending on the support. For slice priority value 2, there are several slices with the same value, so an extra parameter p3 is added to take the number of supported slices into account. This parameter is given the value 0-3, based on the number of slices with priority 2 that are supported on the frequency. The parameter is expressed binary. (Digital value in parentheses).
3. The slice_support_priority is given by concatenating the binary parameters p1-p4, and then transfer to digital domain.
4. The reselection priority is set to the highest slice specific reselect priority of the slices that are highest prioritized and supported. If there is no slice specific reselect priority for a slice, the reselect priority 0 is used. Therefore, in the example, for frequency C, the reselect priority is max(3,4,0)=4, and for frequency E, the legacy value is used, since no prioritized slice is supported.
5. The slice_based_reselection_priority is calculated by multiplying the slice_support_priority with the range of the legacy reselection priority, and adding the legacy cell reselection priority value for the frequency. For example, for frequency A, 29*10+7=297.

Results are shown in FIG. 6. The resulting priority order for cell reselection is frequency A, D, B, C, E.

Step 340—Perform Cell Search According to one of the one or more Reselection Priorities Step 340 can comprise performing cell search according to one of the one or more reselection priorities. In some embodiments there are no changes to the legacy procedure, except that the slice-based reselection priorities can be used instead of the legacy reselection priorities. The UE can search the frequencies in priority order for the best cell. If the best cell is a suitable cell, the procedure can be exited. Output from the procedure can comprise the target cell and the frequency of that cell (target frequency). The definition of suitable cell from TS 38.304 can be applicable here. 'Best cell' can refer to that cell that is most preferred, or best scoring according to the reselection priorities, or according to another type of criterion (e.g., support) or ranking technique.

Step 350—Evaluate Slice Support of the Target Cell

Step 350 can comprise evaluating slice support of the target cell to determine if it meets an expected slice support. The slice support of target cell may be evaluated based on signalled information, or previously stored slice support information. If the slice support of the target cell is the same as used for the target frequency in step 330, then the process can continue to step 380. If not, the procedure can continue with step 360. In some embodiments, this step 350 may be omitted, and the UE may go directly to step 380 instead.

Step 360—Calculate new Reselection Priority for the Target Cell

Step 360 can comprise calculating new reselection or frequency priorities, such as for the target cell. The slice-based reselection priority of the target cell frequency can be updated, if the target cell does not support all slices that were assumed in step 330. How this is done depends on the algorithm used in step 330. The updated slice-based reselection priority may be used by the cell re-selection procedure. It can be valid as long as the target cell is the strongest cell on the frequency.

Step 370—Control if Target Frequency is Still Highest Priority

Step 370 is controlling if the target frequency is still the highest priority. If this step is reached, the UE knows that all frequencies that had higher priority than the frequency of the target cell during the previous cell search have been tested already, so they can be excluded from any continued cell search. If the target frequency with the recalculated priority value still has the highest priority of the remaining frequencies, the target cell is the best cell, even though it does not support all expected slices—and the process can continue to step 380. If there are other frequencies with higher priority than the target cell, then the method should return to step 340, and continue the legacy cell reselection based on the new slice-based reselection priorities.

Step 380—Camp on the Cell

Step 380 can comprise camping on the target cell. Here the method being performed by the UE can use legacy procedures to camp on the target cell.

Additional Embodiments

Figure 7:
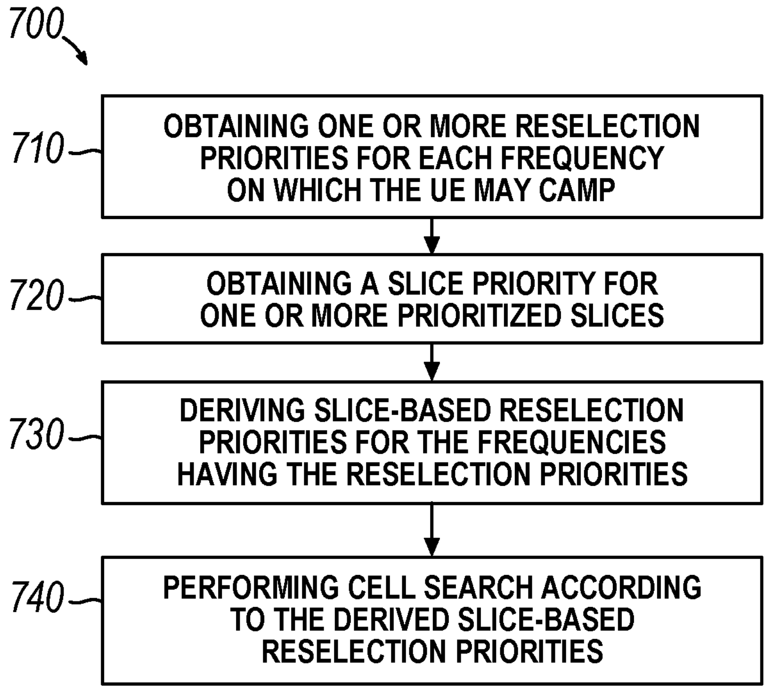
FIG. 7 shows a flow-chart of further method embodiment under the present disclosure.

Another possible method embodiment under the present disclosure is shown in FIG. 7. Method 700 comprises a method performed by a UE for deriving slice-based reselection priorities for selecting a frequency that supports one or more network slices. Step 710 is obtaining one or more reselection priorities for each frequency on which the UE may camp. Step 720 is obtaining a slice priority for one or more prioritized slices. Step 730 is deriving slice-based reselection priorities for the frequencies having the reselection priorities. Step 740 is performing cell search according to the derived slice-based reselection priorities. Further steps in method 700 can be optional. Certain steps can resemble the embodiments illustrated in FIGS. 2 and 3. For example, the method can further include updating the derived slice-based reselection priorities with one or more updated reselection priorities related to e.g., the performed cell search or slice support at one or more selected or target cells. The method can also include performing another cell search with the updated derived slice-based reselection priorities when the UE is unable to camp on the one or more target cells. Alternatively, another step can be determining if a slice support for a target cell meets an expected slice support, and if the slice support meets the expected slice support, then camping on the target cell. If the slice support does not meet the expected slice support, then the UE can calculate a new reselection priority for the target cell and update the derived slice-based reselection priorities. Also, the UE can determine if the new reselection priority has the highest priority. If it does, then the UE camps on the target cell. If the new reselection priority does not have the highest priority, then the UE continues performing cell search but now using the updated derived slice-based reselection priorities.

Method 700 can comprise other variations and embodiments and/or additional and/or alternative steps. The one or more reselection priorities can comprise at least one of, one or more slice-specific reselection priorities and one or more legacy frequency reselection priorities. The one or more reselection priorities can be based at least in part on a list of frequencies where the slice is supported, or the one or more reselection priorities can comprise slice specific priority of each frequency supporting the slice. In some embodiments if there is no slice support information available for a slice, then the slice is supported on all frequencies in the network. In some cases, if there is no slice support information available for a slice, then the slice support is not taken into account for cell reselection. In some cases, if there is no slice support information available for a slice, then the slice is not supported on any available frequency. In some embodiments, the slice priority for each of the one or more prioritized slices can comprise a list of slices prioritized for cell reselection and a priority value for each of the listed slices. In one variation the list of slices is received at an AS layer of the UE and/or is sent from the NAS layer. In some embodiments the deriving can comprise ordering each frequency where the UE may camp in a list based on the one or more reselection priorities, and further comprises assigning each frequency where the UE may camp a slice-based reselection priority reflecting the order in the list.

Some embodiments have calculating slice-based reselection priorities for all frequencies that comprises two or more sub-priorities for each frequency. In some alternatives the two or more sub-priorities is based on a support of prioritized slices on the frequency. In some alternatives one of the two or more sub-priorities is based on reselection priorities. In some embodiments, the sub-priority (p1) based on support of prioritized slices on the frequency is given by the priority of the slice highest prioritized and supported on the frequency and if no prioritized slice is supported then p1=0. In some embodiments p2 equals the number of supported slices with the same priority as p1 and if there are several slices with the same slice priority, then frequencies supporting multiple slices get higher priority than frequencies only supporting one. In some embodiments the sub-priority (pn) based on support of prioritized slices on the frequency is given such that p1 gives support of slice with highest priority, p2 support of slice with second highest priority and so forth, and wherein p1, p2 . . . pn, can be combined to form a binary number taking the support of all prioritized slices into account. I other embodiments the sub-priority (pn) based on support of prioritized slices on the frequency is given such that p1 gives number of slices with highest priority supported on the frequency, p2 number of slices with second highest priority supported in the frequency and so forth. In other embodiments the ranges (r1, r2 . . . rn) of the sub-priorities (p1, p2 . . . pn) are given by the number of slices with each priority value +1, so that r1=number of slices with highest priority level +1, r2=number of slices with the second highest priority level +1, etc. And the sub-priorities are combined using the formula: (((p1*r2+p2)*r3+p3)*r4 . . . p(n−1))*rn+pn. In some variations the sub-priorities (p1, p2 . . . pn) are represented by binary numbers, and the number of digits used for p1 is given by the number of bits needed to represent the number of slices with the highest priority level, the number of digits used for p2 is given by the number of bits needed to represent the number of slices with the second highest priority level, etc., wherein p1, p2 . . . pn, are combined to form a binary slice support priority number taking the support of all prioritized slices into account. In other embodiments, the sub-priority based on reselection priorities (Pr) is based on legacy cell-reselection priority. Sometimes, the sub-priority based on reselection priorities (Pr) is based on slice specific reselection priority of the slice highest prioritized and supported. Sometimes, if no slice specific reselection priority is available for a supported slice, the value 0 is used. In certain alternatives, if no slice specific reselection priority is available for a supported slice, the legacy value is used.

In some variations, performing cell search according to one of the one or more reselection priorities comprises performing cell search on all frequencies using the derived slice-based reselection priorities. In other variations, performing cell search according to one of the one or more reselection priorities comprises performing cell search on all frequencies using the derived slice-based reselection priorities. In some embodiments, determining if a slice support for a target cell meets an expected slice support comprises comparing the slice support per frequency based on the slice-specific reselection priorities with received slice support information per cell. In other embodiments, determining if a slice support for a target cell meets an expected slice support comprises comparing the slice support per frequency based on the slice-specific reselection priorities with stored slice support information per cell. In some embodiments, one of the two or more sub-priorities is based on a support of prioritized slices on the frequency, and another of the two or more sub-priorities is based on reselection priorities. In some embodiments, the method further comprises providing user data and forwarding the user data to a host via the transmission to the network node.

Figure 8:
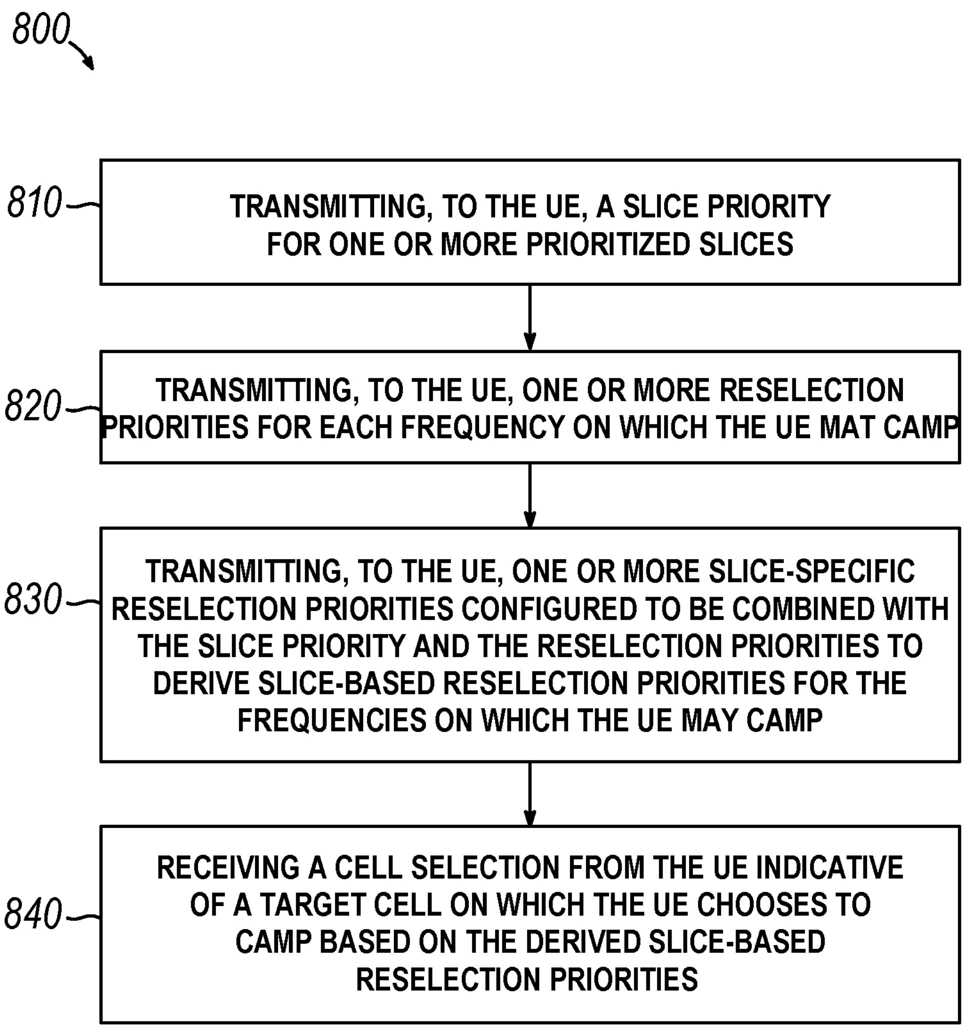
FIG. 8 shows a flow-chart of another possible method embodiment under the present disclosure.

Another embodiment possible method embodiment under the present disclosure is shown in FIG. 8. Method 800 comprises a method performed by a network for providing data to a UE for deriving slice-based reselection priorities for selecting a frequency that supports one or more network slices. Step 810 is transmitting, to the UE, a slice priority for one or more prioritized slices. Step 820 is transmitting, to the UE, one or more reselection priorities for each frequency on which the UE may camp. Step 830 is transmitting, to the UE, one or more slice-specific reselection priorities configured to be combined with the slice priority and the reselection priorities to derive slice-based reselection priorities for the frequencies on which the UE may camp. Step 840 is receiving a cell selection from the UE indicative of a target cell on which the UE chooses to camp based on the derived slice-based reselection priorities.

Method 800 can comprise multiple alternative embodiments with additional or alternative steps. In some variations, the target cell can be further based on the UE updating the derived slice-based reselection priorities. In another possibility, the cell selection results from the UE performing one or more cell searches according to the derived slice-based reselection priorities, and wherein after each of the one or more cell searches the UE updates the derived slice-based reselection priorities based at least in part on the performed cell search and whether a slice support for a cell selection meets an expected slice support. In other possible embodiments the one or more reselection priorities can comprise at least one of; one or more slice-specific reselection priorities; and one or more legacy frequency reselection priorities. In certain embodiments, the one or more reselection priorities are based at least in part on a list of frequencies where the slice is supported. In some embodiments, the one or more reselection priorities comprise slice specific priority of each frequency supporting the slice. In some variation, if there is no slice support information available for a slice, then the slice is supported on all frequencies in the network. In other variations, if there is no slice support information available for a slice, then the slice support is not taken into account for cell reselection. In other variations, if there is no slice support information available for a slice, then the slice is not supported on any available frequency. In certain embodiments, the slice priority for each of the one or more prioritized slices comprises a list of slices prioritized for cell reselection and a priority value for each of the listed slices. In some embodiments, transmitting a slice priority is performed by an AMF. In some embodiments, transmitting a slice priority is performed by a gNB. In some embodiments, transmitting one or more reselection priorities is performed by a gNB. In certain variations, the gNB comprises the UE's current camping cell. In certain variations, the transmitting one or more slice-specific reselection priorities is performed by a gNB. In certain variations, the gNB comprises the UE's current camping cell.

Additional Embodiments

Figure 9:
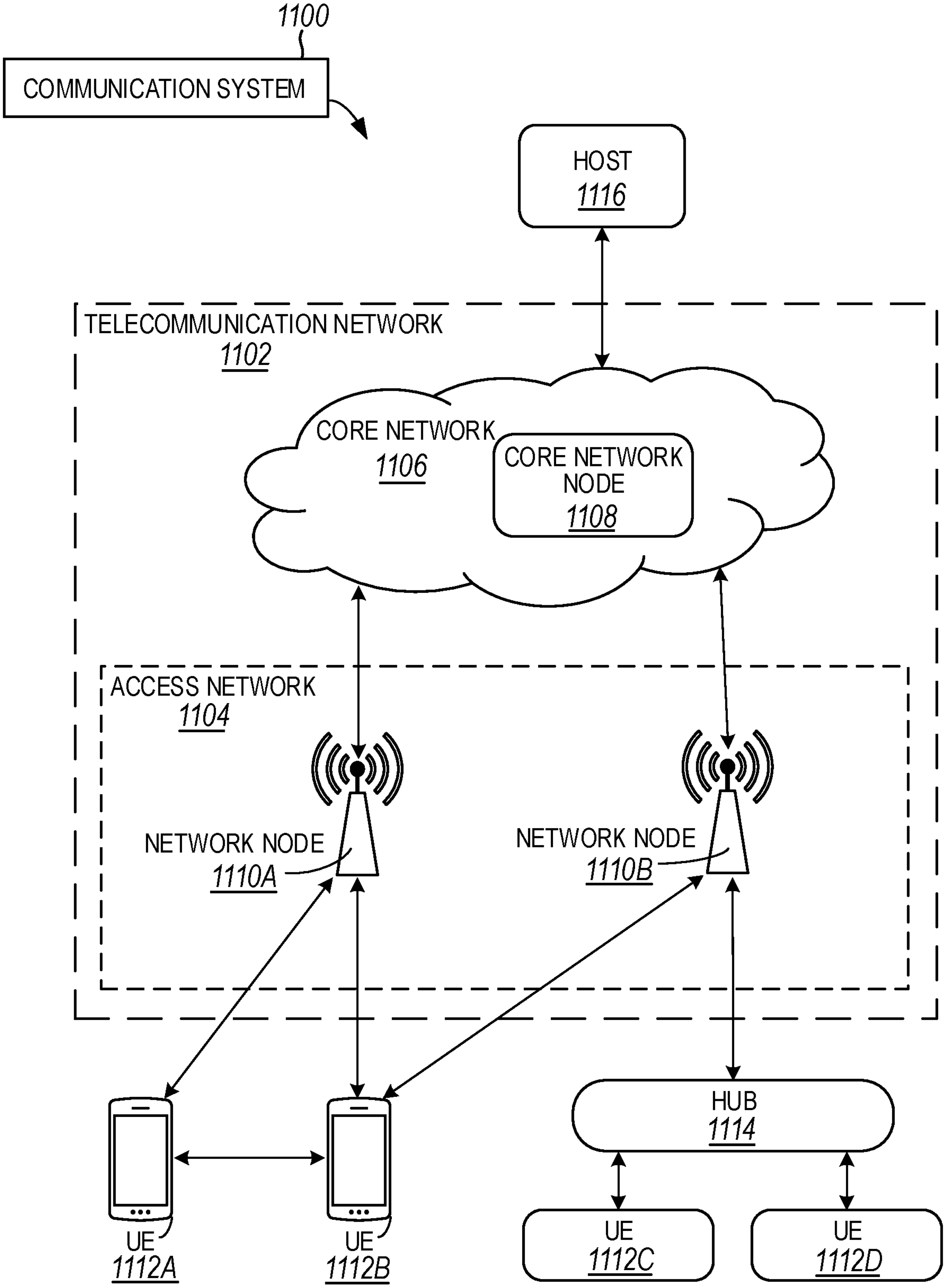
FIG. 9 shows a schematic of a communication system embodiment under the present disclosure.

FIG. 9 shows an example of a communication system 1100 in accordance with some embodiments. In the example, the communication system 1100 includes a telecommunication network 1102 that includes an access network 1104, such as a radio access network (RAN), and a core network 1106, which includes one or more core network nodes 1108. The access network 1104 includes one or more access network nodes, such as network nodes 1110*a* and 1110*b* (one or more of which may be generally referred to as network nodes 1110), or any other similar 3rd Generation Partnership Project (3GPP) access node or non-3GPP access point. The network nodes 1110 facilitate direct or indirect connection of user equipment (UE), such as by connecting UEs 1112*a*, 1112*b*, 1112*c*, and 1112*d* (one or more of which may be generally referred to as UEs 1112) to the core network 1106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The UEs 1112 may be any of a wide variety of communication devices, including wireless devices arranged, configured, and/or operable to communicate wirelessly with the network nodes 1110 and other communication devices. Similarly, the network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

In the depicted example, the core network 1106 connects the network nodes 1110 to one or more hosts, such as host 1116. These connections may be direct or indirect via one or more intermediary networks or devices. In other examples, network nodes may be directly coupled to hosts. The core network 1106 includes one more core network nodes (e.g., core network node 1108) that are structured with hardware and software components. Features of these components may be substantially similar to those described with respect to the UEs, network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1116 may be under the ownership or control of a service provider other than an operator or provider of the access network 1104 and/or the telecommunication network 1102, and may be operated by the service provider or on behalf of the service provider. The host 1116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 9 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1102 is a cellular network that implements 3GPP standardized features. Accordingly, the telecommunications network 1102 may support network slicing to provide different logical networks to different devices that are connected to the telecommunication network 1102. For example, the telecommunications network 1102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1114 communicates with the access network 1104 to facilitate indirect communication between one or more UEs (e.g., UE 1112*c* and/or 1112*d*) and network nodes (e.g., network node 1110*b*). In some examples, the hub 1114 may be a controller, router, content source and analytics, or any of the other communication devices described herein regarding UEs. For example, the hub 1114 may be a broadband router enabling access to the core network 1106 for the UEs. As another example, the hub 1114 may be a controller that sends commands or instructions to one or more actuators in the UEs. Commands or instructions may be received from the UEs, network nodes 1110, or by executable code, script, process, or other instructions in the hub 1114. As another example, the hub 1114 may be a data collector that acts as temporary storage for UE data and, in some embodiments, may perform analysis or other processing of the data. As another example, the hub 1114 may be a content source. For example, for a UE that is a VR headset, display, loudspeaker or other media delivery device, the hub 1114 may retrieve VR assets, video, audio, or other media or data related to sensory information via a network node, which the hub 1114 then provides to the UE either directly, after performing local processing, and/or after adding additional local content. In still another example, the hub 1114 acts as a proxy server or orchestrator for the UEs, in particular in if one or more of the UEs are low energy IoT devices.

The hub 1114 may have a constant/persistent or intermittent connection to the network node 1110*b*. The hub 1114 may also allow for a different communication scheme and/or schedule between the hub 1114 and UEs (e.g., UE 1112*c* and/or 1112*d*), and between the hub 1114 and the core network 1106. In other examples, the hub 1114 is connected to the core network 1106 and/or one or more UEs via a wired connection. Moreover, the hub 1114 may be configured to connect to an M2M service provider over the access network 1104 and/or to another UE over a direct connection. In some scenarios, UEs may establish a wireless connection with the network nodes 1110 while still connected via the hub 1114 via a wired or wireless connection. In some embodiments, the hub 1114 may be a dedicated hub—that is, a hub whose primary function is to route communications to/from the UEs from/to the network node 1110*b*. In other embodiments, the hub 1114 may be a non-dedicated hub—that is, a device which is capable of operating to route communications between the UEs and network node 1110*b*, but which is additionally capable of operating as a communication start and/or end point for certain data channels.

Figure 10:
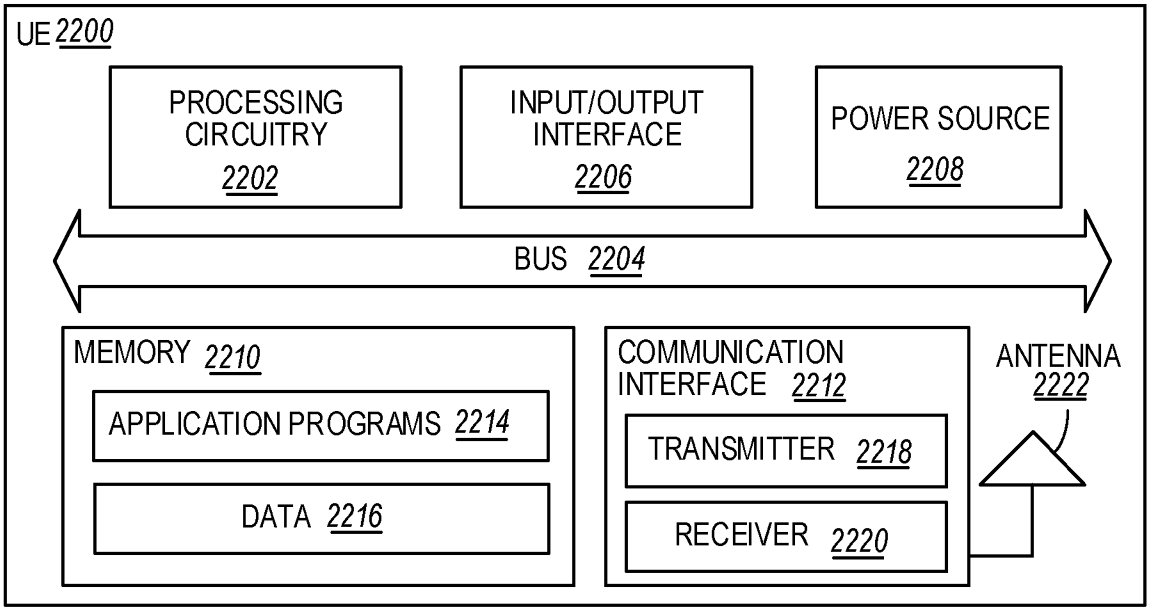
FIG. 10 shows a schematic of a user equipment embodiment under the present disclosure.

FIG. 10 shows a UE 2200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 2200 includes processing circuitry 2202 that is operatively coupled via a bus 2204 to an input/output interface 2206, a power source 2208, a memory 2210, a communication interface 2212, and/or any other component, or any combination thereof. Certain UEs may utilize all or a subset of the components shown in FIG. 10. The level of integration between the components may vary from one UE to another UE. Further, certain UEs may contain multiple instances of a component, such as multiple processors, memories, transceivers, transmitters, receivers, etc.

The processing circuitry 2202 is configured to process instructions and data and may be configured to implement any sequential state machine operative to execute instructions stored as machine-readable computer programs in the memory 2210. The processing circuitry 2202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 2202 may include multiple central processing units (CPUs).

In the example, the input/output interface 2206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 2200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 2208 is structured as a battery or battery pack. Other types of power sources, such as an external power source (e.g., an electricity outlet), photovoltaic device, or power cell, may be used. The power source 2208 may further include power circuitry for delivering power from the power source 2208 itself, and/or an external power source, to the various parts of the UE 2200 via input circuitry or an interface such as an electrical power cable. Delivering power may be, for example, for charging of the power source 2208. Power circuitry may perform any formatting, converting, or other modification to the power from the power source 2208 to make the power suitable for the respective components of the UE 2200 to which power is supplied.

The memory 2210 may be or be configured to include memory such as random-access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 2210 includes one or more application programs 2214, such as an operating system, web browser application, a widget, gadget engine, or other application, and corresponding data 2216. The memory 2210 may store, for use by the UE 2200, any of a variety of various operating systems or combinations of operating systems.

The memory 2210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 2210 may allow the UE 2200 to access instructions, application programs and the like, stored on transitory or non-transitory memory media, to off-load data, or to upload data. An article of manufacture, such as one utilizing a communication system may be tangibly embodied as or in the memory 2210, which may be or comprise a device-readable storage medium.

The processing circuitry 2202 may be configured to communicate with an access network or other network using the communication interface 2212. The communication interface 2212 may comprise one or more communication subsystems and may include or be communicatively coupled to an antenna 2222. The communication interface 2212 may include one or more transceivers used to communicate, such as by communicating with one or more remote transceivers of another device capable of wireless communication (e.g., another UE or a network node in an access network). Each transceiver may include a transmitter 2218 and/or a receiver 2220 appropriate to provide network communications (e.g., optical, electrical, frequency allocations, and so forth). Moreover, the transmitter 2218 and receiver 2220 may be coupled to one or more antennas (e.g., antenna 2222) and may share circuit components, software or firmware, or alternatively be implemented separately.

In the illustrated embodiment, communication functions of the communication interface 2212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 2212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 2200 shown in FIG. 10.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 11:
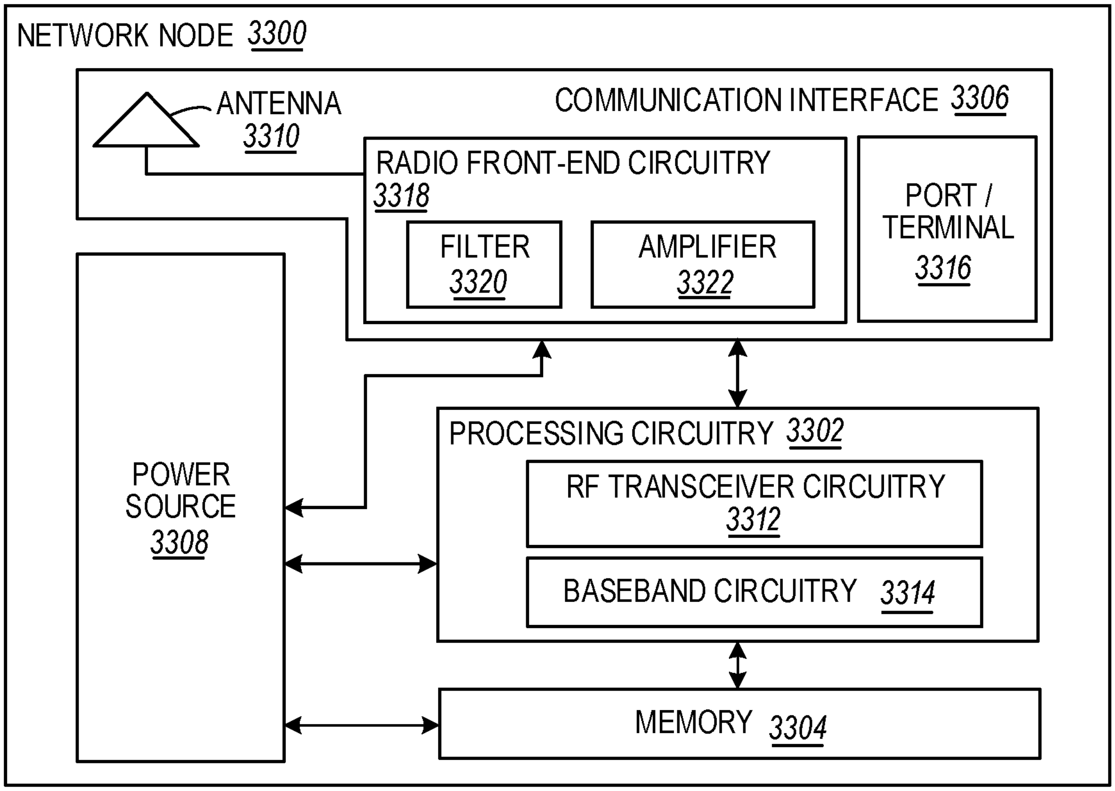
FIG. 11 shows a schematic of a network node embodiment under the present disclosure.

FIG. 11 shows a network node 3300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 3300 includes a processing circuitry 3302, a memory 3304, a communication interface 3306, and a power source 3308. The network node 3300 may be composed of multiple physically separate components (e.g., a NodeB component and a RNC component, or a BTS component and a BSC component, etc.), which may each have their own respective components. In certain scenarios in which the network node 3300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 3304 for different RATs) and some components may be reused (e.g., a same antenna 3310 may be shared by different RATs). The network node 3300 may also include multiple sets of the various illustrated components for different wireless technologies integrated into network node 1300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1300.

The processing circuitry 3302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 3300 components, such as the memory 3304, to provide network node 3300 functionality.

In some embodiments, the processing circuitry 3302 includes a system on a chip (SOC). In some embodiments, the processing circuitry 3302 includes one or more of radio frequency (RF) transceiver circuitry 3312 and baseband processing circuitry 3314. In some embodiments, the radio frequency (RF) transceiver circuitry 3312 and the baseband processing circuitry 3314 may be on separate chips (or sets of chips), boards, or units, such as radio units and digital units. In alternative embodiments, part or all of RF transceiver circuitry 3312 and baseband processing circuitry 3314 may be on the same chip or set of chips, boards, or units.

The memory 3304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 3302. The memory 3304 may store any suitable instructions, data, or information, including a computer program, software, an application including one or more of logic, rules, code, tables, and/or other instructions capable of being executed by the processing circuitry 3302 and utilized by the network node 3300. The memory 3304 may be used to store any calculations made by the processing circuitry 3302 and/or any data received via the communication interface 3306. In some embodiments, the processing circuitry 3302 and memory 3304 is integrated.

The communication interface 3306 is used in wired or wireless communication of signaling and/or data between a network node, access network, and/or UE. As illustrated, the communication interface 3306 comprises port(s)/terminal(s) 3316 to send and receive data, for example to and from a network over a wired connection. The communication interface 3306 also includes radio front-end circuitry 3318 that may be coupled to, or in certain embodiments a part of, the antenna 3310. Radio front-end circuitry 3318 comprises filters 3320 and amplifiers 3322. The radio front-end circuitry 3318 may be connected to an antenna 3310 and processing circuitry 3302. The radio front-end circuitry may be configured to condition signals communicated between antenna 3310 and processing circuitry 3302. The radio front-end circuitry 3318 may receive digital data that is to be sent out to other network nodes or UEs via a wireless connection. The radio front-end circuitry 3318 may convert the digital data into a radio signal having the appropriate channel and bandwidth parameters using a combination of filters 3320 and/or amplifiers 3322. The radio signal may then be transmitted via the antenna 3310. Similarly, when receiving data, the antenna 3310 may collect radio signals which are then converted into digital data by the radio front-end circuitry 3318. The digital data may be passed to the processing circuitry 3302. In other embodiments, the communication interface may comprise different components and/or different combinations of components.

In certain alternative embodiments, the network node 3300 does not include separate radio front-end circuitry 3318, instead, the processing circuitry 3302 includes radio front-end circuitry and is connected to the antenna 3310. Similarly, in some embodiments, all or some of the RF transceiver circuitry 3312 is part of the communication interface 3306. In still other embodiments, the communication interface 3306 includes one or more ports or terminals 3316, the radio front-end circuitry 3318, and the RF transceiver circuitry 3312, as part of a radio unit (not shown), and the communication interface 3306 communicates with the baseband processing circuitry 3314, which is part of a digital unit (not shown).

The antenna 3310 may include one or more antennas, or antenna arrays, configured to send and/or receive wireless signals. The antenna 3310 may be coupled to the radio front-end circuitry 3318 and may be any type of antenna capable of transmitting and receiving data and/or signals wirelessly. In certain embodiments, the antenna 3310 is separate from the network node 3300 and connectable to the network node 3300 through an interface or port.

The antenna 3310, communication interface 3306, and/or the processing circuitry 3302 may be configured to perform any receiving operations and/or certain obtaining operations described herein as being performed by the network node. Any information, data and/or signals may be received from a UE, another network node and/or any other network equipment. Similarly, the antenna 3310, the communication interface 3306, and/or the processing circuitry 3302 may be configured to perform any transmitting operations described herein as being performed by the network node. Any information, data and/or signals may be transmitted to a UE, another network node and/or any other network equipment.

The power source 3308 provides power to the various components of network node 3300 in a form suitable for the respective components (e.g., at a voltage and current level needed for each respective component). The power source 3308 may further comprise, or be coupled to, power management circuitry to supply the components of the network node 3300 with power for performing the functionality described herein. For example, the network node 3300 may be connectable to an external power source (e.g., the power grid, an electricity outlet) via an input circuitry or interface such as an electrical cable, whereby the external power source supplies power to power circuitry of the power source 3308. As a further example, the power source 3308 may comprise a source of power in the form of a battery or battery pack which is connected to, or integrated in, power circuitry. The battery may provide backup power should the external power source fail.

Embodiments of the network node 3300 may include additional components beyond those shown in FIG. 11 for providing certain aspects of the network node's functionality, including any of the functionality described herein and/or any functionality necessary to support the subject matter described herein. For example, the network node 3300 may include user interface equipment to allow input of information into the network node 3300 and to allow output of information from the network node 3300. This may allow a user to perform diagnostic, maintenance, repair, and other administrative functions for the network node 3300.

Figure 12:
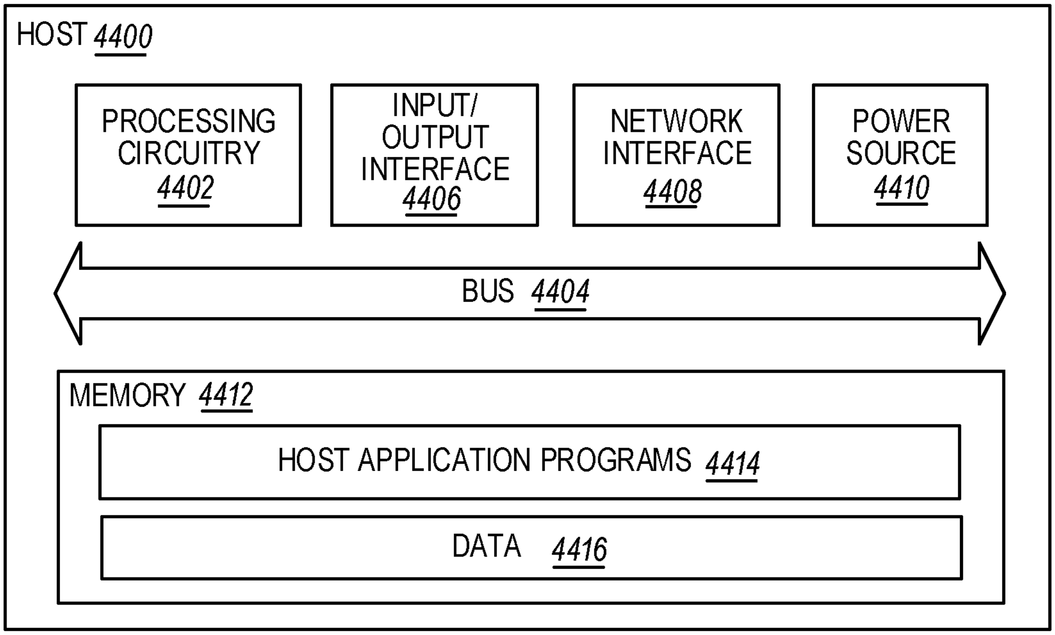
FIG. 12 shows a schematic of a host embodiment under the present disclosure.

FIG. 12 is a block diagram of a host 4400, which may be an embodiment of the host 1116 of FIG. 9, in accordance with various aspects described herein. As used herein, the host 4400 may be or comprise various combinations hardware and/or software, including a standalone server, a blade server, a cloud-implemented server, a distributed server, a virtual machine, container, or processing resources in a server farm. The host 4400 may provide one or more services to one or more UEs.

The host 4400 includes processing circuitry 4402 that is operatively coupled via a bus 4404 to an input/output interface 4406, a network interface 4408, a power source 4410, and a memory 4412. Other components may be included in other embodiments. Features of these components may be substantially similar to those described with respect to the devices of previous figures, such as FIGS. 10 and 11, such that the descriptions thereof are generally applicable to the corresponding components of host 4400.

The memory 4412 may include one or more computer programs including one or more host application programs 4414 and data 4416, which may include user data, e.g., data generated by a UE for the host 4400 or data generated by the host 4400 for a UE. Embodiments of the host 4400 may utilize only a subset or all of the components shown. The host application programs 4414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 4414 may also provide for user authentication and licensing checks and may periodically report health, routes, and content availability to a central node, such as a device in or on the edge of a core network. Accordingly, the host 4400 may select and/or indicate a different host for over-the-top services for a UE. The host application programs 4414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 13:
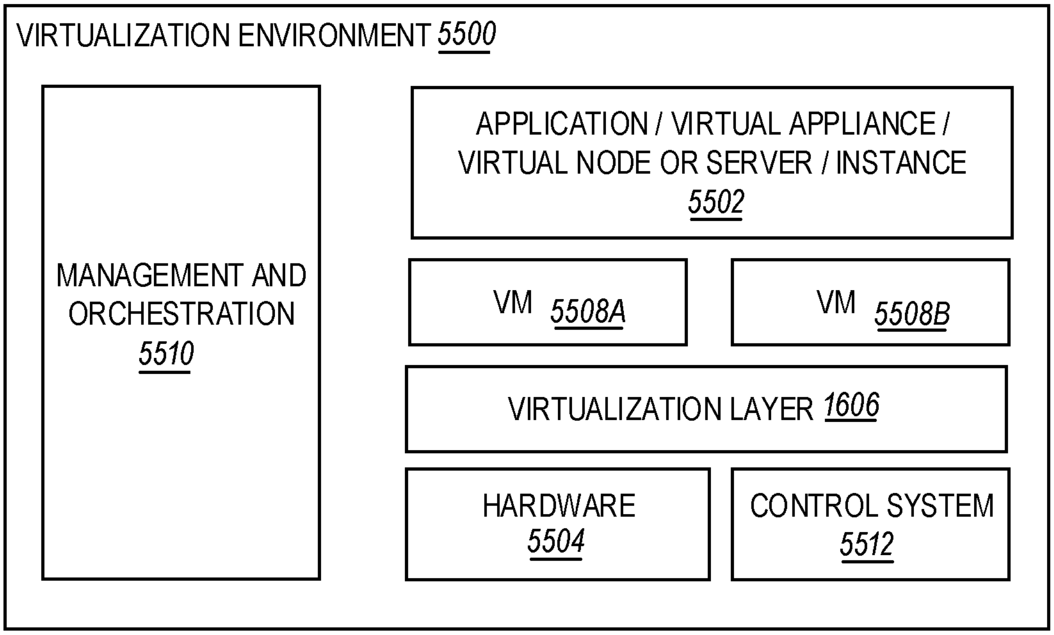
FIG. 13 shows a schematic of a virtualization environment embodiment under the present disclosure.

FIG. 13 is a block diagram illustrating a virtualization environment 5500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 5500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 5502 (which may alternatively be called software instances, virtual appliances, network functions, virtual nodes, virtual network functions, etc.) are run in the virtualization environment 5500 to implement some of the features, functions, and/or benefits of some of the embodiments disclosed herein.

Hardware 5504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 5506 (also referred to as hypervisors or virtual machine monitors (VMMs)), provide VMs 5508*a* and 5508*b* (one or more of which may be generally referred to as VMs 5508), and/or perform any of the functions, features and/or benefits described in relation with some embodiments described herein. The virtualization layer 5506 may present a virtual operating platform that appears like networking hardware to the VMs 5508.

The VMs 5508 comprise virtual processing, virtual memory, virtual networking or interface and virtual storage, and may be run by a corresponding virtualization layer 5506. Different embodiments of the instance of a virtual appliance 5502 may be implemented on one or more of VMs 5508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 5508 may be a software implementation of a physical machine that runs programs as if they were executing on a physical, non-virtualized machine. Each of the VMs 5508, and that part of hardware 5504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 5508 on top of the hardware 5504 and corresponds to the application 5502.

Hardware 5504 may be implemented in a standalone network node with generic or specific components. Hardware 5504 may implement some functions via virtualization. Alternatively, hardware 5504 may be part of a larger cluster of hardware (e.g., such as in a data center or CPE) where many hardware nodes work together and are managed via management and orchestration 5510, which, among others, oversees lifecycle management of applications 5502. In some embodiments, hardware 5504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 5512 which may alternatively be used for communication between hardware nodes and radio units.

Figure 14:
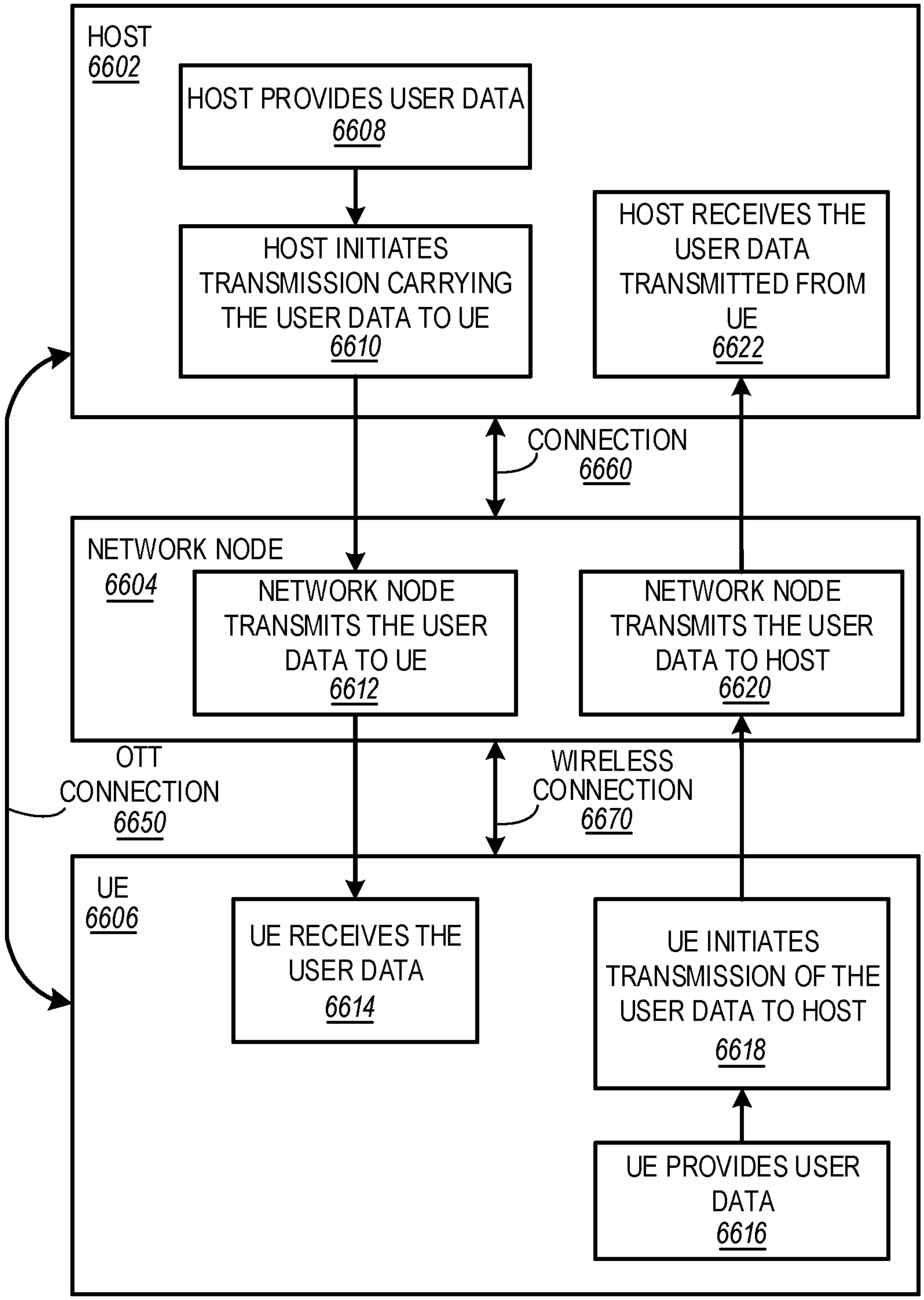
FIG. 14 shows a schematic representation of an embodiment of communication amongst nodes, hosts, and user equipment under the present disclosure.

FIG. 14 shows a communication diagram of a host 6602 communicating via a network node 6604 with a UE 6606 over a partially wireless connection in accordance with some embodiments. Example implementations, in accordance with various embodiments, of the UE (such as a UE 1112*a* of FIG. 9 and/or UE 2200 of FIG. 10), network node (such as network node 1110*a* of FIG. 9 and/or network node 3300 of FIG. 11), and host (such as host 1116 of FIG. 9 and/or host 4400 of FIG. 12) discussed in the preceding paragraphs will now be described with reference to FIG. 14.

Like host 4400, embodiments of host 6602 include hardware, such as a communication interface, processing circuitry, and memory. The host 6602 also includes software, which is stored in or accessible by the host 6602 and executable by the processing circuitry. The software includes a host application that may be operable to provide a service to a remote user, such as the UE 6606 connecting via an over-the-top (OTT) connection 6650 extending between the UE 6606 and host 6602. In providing the service to the remote user, a host application may provide user data which is transmitted using the OTT connection 6650.

The network node 6604 includes hardware enabling it to communicate with the host 6602 and UE 6606. The connection 6660 may be direct or pass through a core network (like core network 1106 of FIG. 9) and/or one or more other intermediate networks, such as one or more public, private, or hosted networks. For example, an intermediate network may be a backbone network or the Internet.

The UE 6606 includes hardware and software, which is stored in or accessible by UE 6606 and executable by the UE's processing circuitry. The software includes a client application, such as a web browser or operator-specific "app" that may be operable to provide a service to a human or non-human user via UE 6606 with the support of the host 6602. In the host 6602, an executing host application may communicate with the executing client application via the OTT connection 6650 terminating at the UE 6606 and host 6602. In providing the service to the user, the UE's client application may receive request data from the host's host application and provide user data in response to the request data. The OTT connection 6650 may transfer both the request data and the user data. The UE's client application may interact with the user to generate the user data that it provides to the host application through the OTT connection 6650.

The OTT connection 6650 may extend via a connection 6660 between the host 6602 and the network node 6604 and via a wireless connection 6670 between the network node 6604 and the UE 6606 to provide the connection between the host 6602 and the UE 6606. The connection 6660 and wireless connection 6670, over which the OTT connection 6650 may be provided, have been drawn abstractly to illustrate the communication between the host 6602 and the UE 1606 via the network node 6604, without explicit reference to any intermediary devices and the precise routing of messages via these devices.

As an example of transmitting data via the OTT connection 6650, in step 6608, the host 6602 provides user data, which may be performed by executing a host application. In some embodiments, the user data is associated with a particular human user interacting with the UE 6606. In other embodiments, the user data is associated with a UE 6606 that shares data with the host 6602 without explicit human interaction. In step 6610, the host 6602 initiates a transmission carrying the user data towards the UE 6606. The host 6602 may initiate the transmission responsive to a request transmitted by the UE 6606. The request may be caused by human interaction with the UE 6606 or by operation of the client application executing on the UE 6606. The transmission may pass via the network node 6604, in accordance with the teachings of the embodiments described throughout this disclosure. Accordingly, in step 6612, the network node 6604 transmits to the UE 6606 the user data that was carried in the transmission that the host 6602 initiated, in accordance with the teachings of the embodiments described throughout this disclosure. In step 6614, the UE 6606 receives the user data carried in the transmission, which may be performed by a client application executed on the UE 6606 associated with the host application executed by the host 6602.

In some examples, the UE 6606 executes a client application which provides user data to the host 6602. The user data may be provided in reaction or response to the data received from the host 6602. Accordingly, in step 6616, the UE 6606 may provide user data, which may be performed by executing the client application. In providing the user data, the client application may further consider user input received from the user via an input/output interface of the UE 6606. Regardless of the specific manner in which the user data was provided, the UE 6606 initiates, in step 6618, transmission of the user data towards the host 6602 via the network node 6604. In step 6620, in accordance with the teachings of the embodiments described throughout this disclosure, the network node 6604 receives user data from the UE 6606 and initiates transmission of the received user data towards the host 6602. In step 6622, the host 6602 receives the user data carried in the transmission initiated by the UE 6606.

One or more of the various embodiments improve the performance of OTT services provided to the UE 6606 using the OTT connection 6650, in which the wireless connection 6670 forms the last segment. More precisely, the teachings of these embodiments may improve the data rate, latency, and/or power consumption and thereby provide benefits such as reduced user waiting time, relaxed restriction on file size, improved content resolution, better responsiveness, and/or extended battery lifetime.

In an example scenario, factory status information may be collected and analyzed by the host 6602. As another example, the host 6602 may process audio and video data which may have been retrieved from a UE for use in creating maps. As another example, the host 6602 may collect and analyze real-time data to assist in controlling vehicle congestion (e.g., controlling traffic lights). As another example, the host 6602 may store surveillance video uploaded by a UE. As another example, the host 6602 may store or control access to media content such as video, audio, VR or AR which it can broadcast, multicast or unicast to UEs. As other examples, the host 6602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 6650 between the host 6602 and UE 6606, in response to variations in the measurement results. The measurement procedure and/or the network functionality for reconfiguring the OTT connection may be implemented in software and hardware of the host 6602 and/or UE 6606. In some embodiments, sensors (not shown) may be deployed in or in association with other devices through which the OTT connection 6650 passes; the sensors may participate in the measurement procedure by supplying values of the monitored quantities exemplified above, or supplying values of other physical quantities from which software may compute or estimate the monitored quantities. The reconfiguring of the OTT connection 6650 may include message format, retransmission settings, preferred routing etc.; the reconfiguring need not directly alter the operation of the network node 6604. Such procedures and functionalities may be known and practiced in the art. In certain embodiments, measurements may involve proprietary UE signaling that facilitates measurements of throughput, propagation times, latency and the like, by the host 6602. The measurements may be implemented in that software causes messages to be transmitted, in particular empty or 'dummy' messages, using the OTT connection 6650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Computer Systems of the Present Disclosure

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

In an embodiment, the communication system may include a complex of computing devices executing any of the method of the embodiments as described above and data storage devices which could be server parks and data centers.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

In general, the various exemplary embodiments may be implemented in hardware or special purpose chips, circuits, software, logic, or any combination thereof. For example, some aspects may be implemented in hardware, while other aspects may be implemented in firmware or software which may be executed by a controller, microprocessor, or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques, or methods described herein may be implemented in, as non-limiting examples, hardware, software, firmware, special purpose circuits or logic, general purpose hardware or controller or other computing devices, or some combination thereof.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality or functionalities. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by wired data links, wireless data links, or by a combination of wired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Abbreviations and Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

CONCLUSION

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by certain embodiments and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A method performed by a user equipment (UE) (2200) for deriving slice-based reselection priorities for selecting a frequency that supports one or more network slices, the method comprising:

obtaining one or more reselection priorities for each frequency on which the UE may camp (710);

obtaining a slice priority for one or more prioritized slices (720);

deriving slice-based reselection priorities for the frequencies having the reselection priorities (730); and performing cell search according to the derived slice-based reselection priorities (740).

2. The method of claim 1, further comprising updating the derived slice-based reselection priorities with one or more updated reselection priorities related to the performed cell search (360 to 340).

3. The method of claim 2, wherein the performing cell search identifies one or more target cells, and wherein the method further comprises performing another cell search (343) with the updated derived slice-based reselection priorities when the UE is unable to camp on the one or more target cells.

4. The method of claim 1 further comprising:

determining if a slice support for a target cell meets an expected slice support (750); and if the slice support meets the expected slice support, then camping on the target cell (380); and if the slice support does not meet the expected slice support, then calculating a new reselection priority for the target cell and updating the derived slice-based reselection priorities (360, 343); and if the new reselection priority has the highest priority, then camping on the target cell (380); and if the new reselection priority does not have the highest priority, then continue performing cell search according to the updated derived slice-based reselection priorities (340).

5. The method of claim 1 further comprising camping on a cell based on the cell search.

6. The method of claim 1, wherein the one or more reselection priorities comprise at least one of, one or more slice-specific reselection priorities and one or more legacy frequency reselection priorities.

7. The method of claim 1, wherein the one or more reselection priorities are based at least in part on a list of frequencies where the slice is supported.

8. The method of claim 1, wherein the one or more reselection priorities comprise slice specific priority of each frequency supporting the slice.

9. The method of claim 1, wherein if there is no slice support information available for a slice, then the slice is supported on all frequencies in the network.

10. The method of claim 1, wherein if there is no slice support information available for a slice, then the slice support is not taken into account for cell reselection.

11. The method of claim 1, wherein if there is no slice support information available for a slice, then the slice is not supported on any available frequency.

12. The method of claim 1, wherein the slice priority for each of the one or more prioritized slices comprises a list of slices prioritized for cell reselection and a priority value for each of the listed slices.

13. A method performed by a network (1106) for providing data to a UE for deriving slice-based reselection priorities for selecting a frequency that supports one or more network slices, the method comprising:

transmitting, to the UE, a slice priority for one or more prioritized slices (810);

transmitting, to the UE, one or more reselection priorities for each frequency on which the UE may camp (820);

transmitting, to the UE, one or more slice-specific reselection priorities configured to be combined with the slice priority and the reselection priorities to derive slice-based reselection priorities for the frequencies on which the UE may camp (830); and receiving a cell selection from the UE indicative of a target cell on which the UE chooses to camp based on the derived slice-based reselection priorities (840).

14. The method of claim 13, wherein the target cell is further based on the UE updating the derived slice-based reselection priorities (343).

15. The method of claim 13, wherein the cell selection results from the UE performing one or more cell searches according to the derived slice-based reselection priorities (340), and wherein after each of the one or more cell searches the UE updates (343) the derived slice-based reselection priorities based at least in part on the performed cell search and whether a slice support for a cell selection meets an expected slice support.

16. The method of claim 13, wherein the one or more reselection priorities comprise at least one of; one or more slice-specific reselection priorities; and one or more legacy frequency reselection priorities.

17. The method of claim 13, wherein the one or more reselection priorities are based at least in part on a list of frequencies where the slice is supported.

18. The method of claim 13, wherein the one or more reselection priorities comprise slice specific priority of each frequency supporting the slice.

19. The method of claim 13, wherein if there is no slice support information available for a slice, then the slice is supported on all frequencies in the network.

20. The method of claim 13, wherein if there is no slice support information available for a slice, then the slice support is not taken into account for cell reselection.

* * * * *